May 4, 1954
J. R. MADEIRA
2,677,453
SELF-POWERED MOBILE TRANSFER CONVEYER
Filed Oct. 15, 1951
2 Sheets-Sheet 2
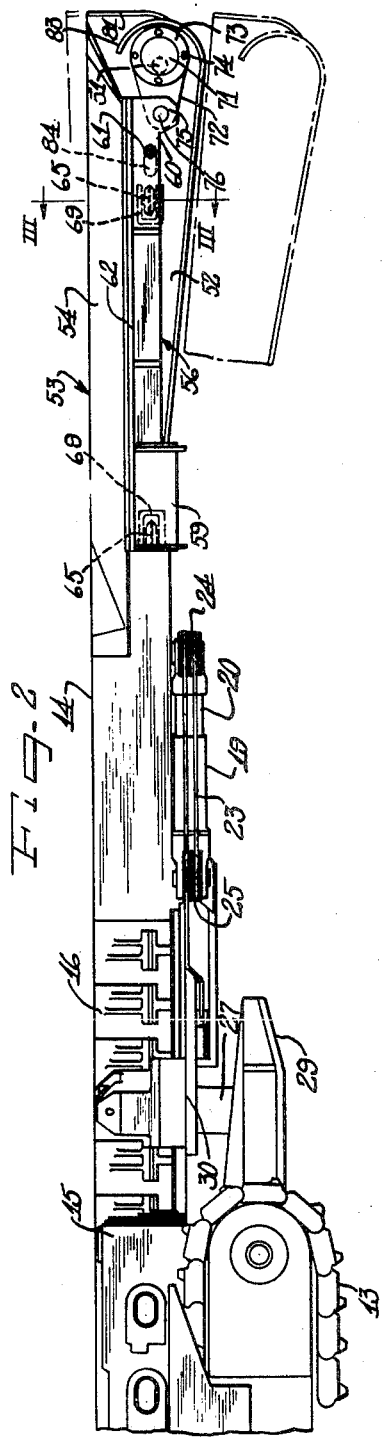
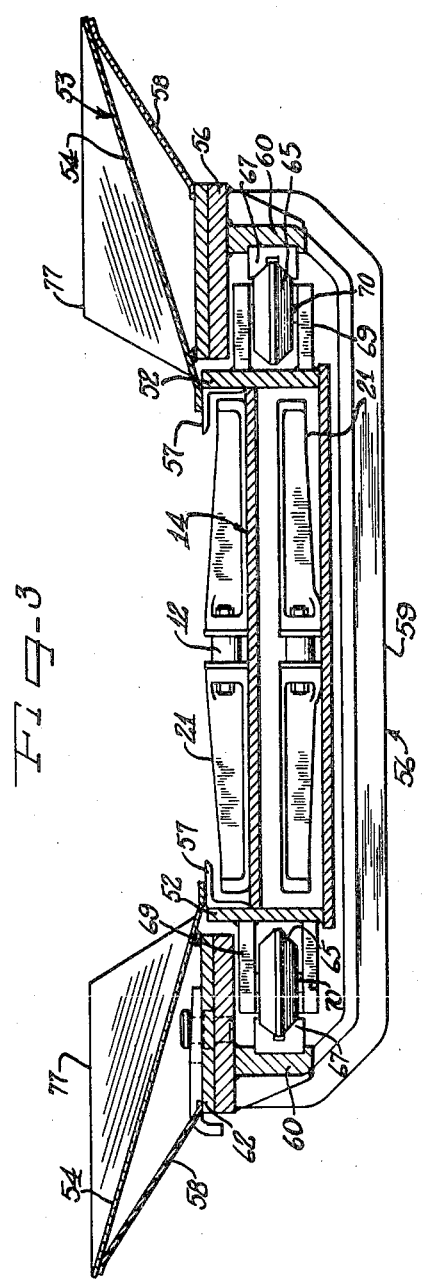
Inventor
John R. Madeira
by Murray Q. Gleeson
Atty Patented May 4, 1954

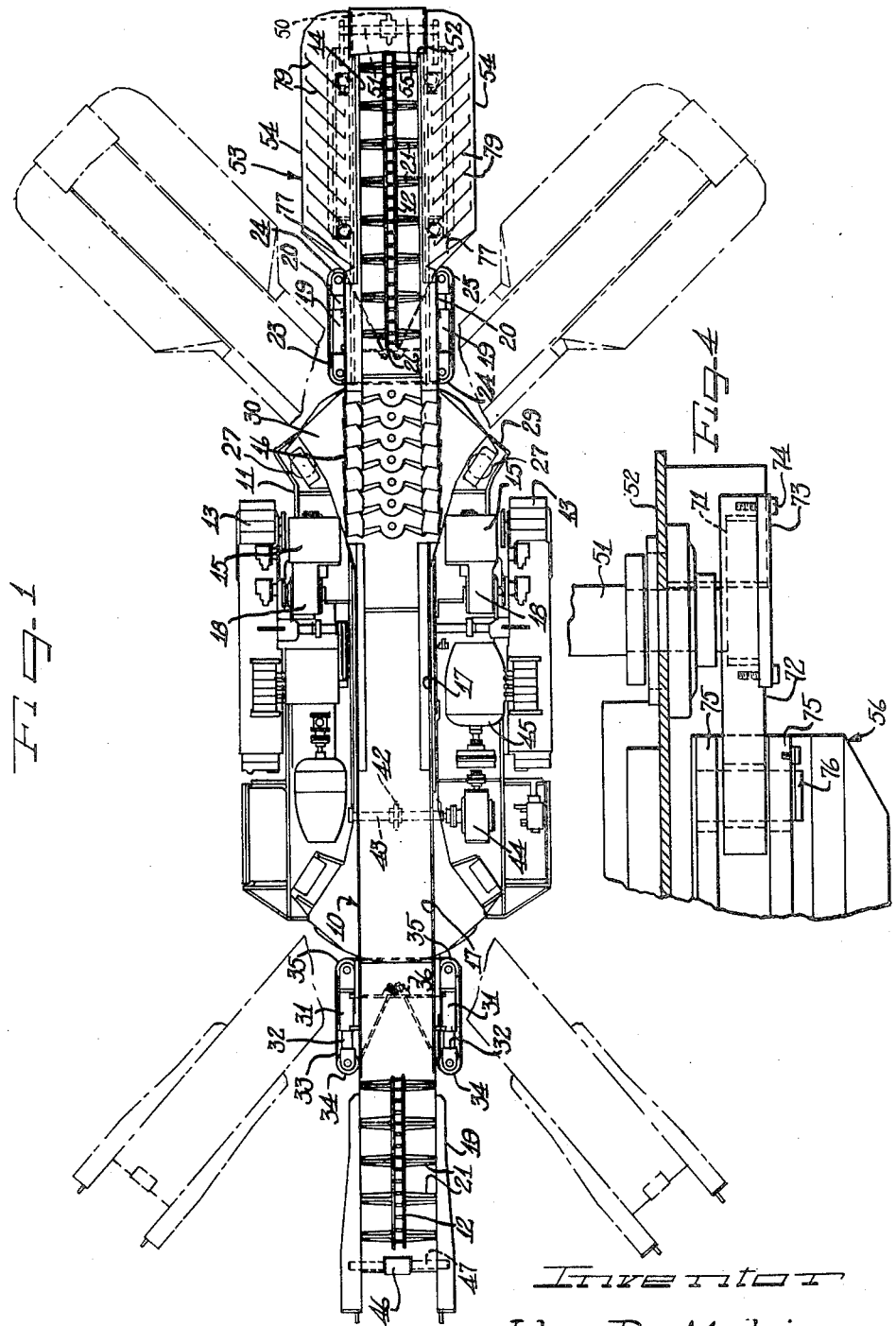

2,677,453

UNITED STATES PATENT OFFICE 2,677,453

SELF-POWERED MOBILE TRANSFER CONVEYER

John R. Madeira, Chicago, Ill., assignor to Goodman Manufacturing Company, Chicago, Ill., a corporation of Illinois Application October 15, 1951, Serial No. 251,310

11 Claims. (Cl. 198—57)

This invention relates to improvements in conveyors and more particularly relates to a new and improved self-powered mobile transfer conveyor and hopper therefor, particularly adapted to transfer loose material, such as coal, in spaces of confined vertical height.

The mining of coal in a continuous cutting and loading operation with no shooting has become quite common at the present day, and machines developed to do this have been very effective in reducing the cost of mining. A major deterring factor in the use of such machines, however, is that no universal system or machine has yet been devised, which will carry coal away from the machine as fast as it is cut and loaded. The shuttle car and conveyor systems in use today only permit the machine to be used at a small percentage of its capacity.

A principal object of my invention is to provide a novel and improved form of self-powered mobile transfer conveyor which will readily follow the discharge end of a continuous cutting and loading machine and take the coal away from the machine as fast as it is loaded thereon, and continuously transfer the coal to a conveyor system, or a shuttle car, or the like.

Another object of my invention is to provide a mobile articulated conveyor arranged to follow the discharge end of a mobile mining machine and having a novel, simplified and improved form of material collecting device of a low overall height, for collecting and transferring the material discharged from the machine onto the conveyor.

A further and more detailed object of my invention is to provide a novel and improved form of mobile articulated conveyor, laterally flexible at its forward and rear ends and arranged to follow the discharge end of a continuous cutting and loading machine, and having a material-receiving hopper at its forward end of a low over-all height to permit a loading machine conveyor to pass thereover and move relative with respect thereto and reciprocably driven to transfer material from the machine onto the transfer conveyor as fast as it is discharged therefrom.

A further and more specific object of my invention is to provide a material collecting and loading hopper for the receiving end of a conveyor of a low over-all height and so arranged so as to efficiently collect and deposit material onto a transfer conveyor as fast as the material is deposited thereon, with a minimum amount of spillage.

A still further and more specific object of my invention is to provide a novel form of material collecting and feeding hopper for the receiving end of a transfer conveyor, mounted on the frame of a conveyor for reciprocable movement with respect thereto and supplying the transfer conveyor with material by reciprocable movement of the hopper.

A still further object of my invention is to provide a reciprocating hopper for collecting and discharging material onto a transfer conveyor and having hopper sides inclined at a flat angle, to operate in spaces of confined vertical height, and having baffles extending along the hopper sides and inclined rearwardly toward the conveyor, for directing material thereon upon reciprocable movement thereof.

These and other objects of my invention will appear from time to time as the following specification proceeds and with reference to the accompanying drawings wherein:

Figure 1 is a top plan view of a mobile transfer conveyor having a hopper constructed in accordance with my invention at the receiving end thereof, and showing the extreme positions of articulation of the conveyor by broken lines;

Figure 2 is an enlarged view in side elevation of the receiving end of the transfer conveyor shown in Figure 1;

Figure 3 is an enlarged transverse sectional view taken substantially along line 3—3 of Figure 2 and illustrating the support for the reciprocating hopper; and Figure 4 is an enlarged fragmentary plan view of the front end of the conveyor, with parts of the hopper removed in order to illustrate certain details of the reciprocating drive mechanism to the hopper.

In Figure 1 of the drawings, a transfer conveyor 10 is shown as extending along the top of a mobile main frame 11 and beyond the forward and rear ends thereof. The main frame 11 is supported for movement along the ground on two laterally spaced continuous tread devices 13, 13, extending along opposite sides thereof. Said continuous tread devices are shown as being driven by motors 15, 15, through reverse gearing and speed reducers 18, 18. The reverse gearing and speed reducers 18, 18 may be individually controlled, to control the direction of travel to the main frame 11 as desired, as is well known to those skilled in the art so not herein shown or described further.

The conveyor 10 is shown as being of a well known form of articulated type utilizing a center strand endless chain including a plurality of strands of chain 12, 12 pivotally connected at their ends to flights 21, 21, for movement about vertical axes. Said chain and flights thus form a continuous laterally flexible chain traveling from one end of the conveyor frame to the other and conforming to the discharge and receiving ends thereof, when in various laterally extending positions with respect to the main frame 11.

The frame for the conveyor 10 is of a type commonly used on face loading machines for coal and other like materials and includes a receiving troughed conveyor frame section 14 suitably mounted on the main frame 11, for lateral movement with respect thereto about a vertical axis and also mounted for vertical adjustment with respect thereto about a transverse axis, to enable the receiving end of said conveyor to follow the loading boom of a continuous cutting and loading machine. A plurality of connected interengaging trough segments 16, 16 are shown as forming the articulated joint for the receiving end of said conveyor frame 14, and with said frame form a continuous trough, when said frame is in various laterally extended positions. The articulated joint of said conveyor frame may be of any well known form and forms no part of my present invention, so need not herein be shown or described further.

The frame section 14 terminates in a trough section 17 extending along the top of the main frame 11, which in turn terminates in an aligned laterally swingable tail or discharge frame section 19, overhanging the rear end of said main frame and laterally swingable into position to discharge the material onto a suitable material transporting means, such as a conveyor or shuttle cars or the like.

The forward or receiving frame section 14 of the conveyor frame is shown as being laterally moved about a vertical axis into the desired position by means of a pair of fluid pressure cylinders 19, 19 and pistons 20, 20 connected to laterally swing said frame by means of a flexible cable 23 trained about sheaves 24 and 25 on said pistons and cylinders respectively and connected at its ends to a stationary part 26 of the machine, as may clearly be seen with reference to Figure 1. Fluid under pressure may be supplied to either of said cylinders to laterally position the receiving end of the conveyor in the desired material receiving location, under the control of suitable valves (not shown).

Vertical adjustment of the frame section 14 of the conveyor is attained by means of fluid pressure cylinders 27, 27 mounted on an outboard support 29 projecting from the forward end of the frame 11 and operatively supporting through their pistons (not shown) a vertically movable frame section 30, supporting the forward frame section 14 for lateral movement with respect thereto, as is well known to those skilled in the art, so not herein shown or described further.

The tail section 19 of the conveyor is likewise moved laterally in one direction or another by means of two fluid pressure cylinders 31, 31 having pistons 32, 32 extensible therefrom and reacting against a flexible cable 33 trained about sheaves 34 and 35 on said pistons and cylinders respectively and secured at its ends to a stationary frame member 36. Said tail section may also be vertically adjustable in a suitable manner and not herein shown or described since it is no part of my present invention.

The conveyor 12 may be driven by a sprocket 42 on a transverse shaft 43 suitably journaled in the main frame 11. The sprocket 42 and shaft 43 are shown as being driven from a speed reducer 44 and motor 45, in a well known manner. The conveyor chain 12 may be maintained in engagement with the sprocket 42 by suitable idlers (not shown) and reverses its direction of travel at the rear end of the conveyor about an idler roller 46 on a transverse shaft 47. Said conveyor chain reverses its direction of travel at the forward end of the conveyor about a sprocket 50 secured to a transverse shaft 51, journaled adjacent its ends in side frame members 52, 52 of the frame 14. The shaft 51 extends beyond the outer sides of said side frame members, and forms a means for reciprocably driving a material transferring hopper 53, as will hereinafter more clearly appear as this specification proceeds.

The hopper 53 is shown as including two hopper sections 54, 54 in the form of inclined plates extending along opposite sides of the receiving end of the conveyor frame 14 at a relatively flat angle, and mounted thereon for reciprocable movement with respect thereto. The hopper sections 54, 54 are shown as being connected together at their forward ends by an inclined plate 55, and with said plate provides a hopper of a sufficiently low over-all height to accommodate the discharge end of a discharge conveyor (not shown) and to allow said conveyor to be moved over the top thereof in places of low head room. The hopper plates or sections 54, 54 are herein shown as being supported on the side frame members 52, 52 of the frame 14 on a reciprocating frame structure 56 and as slidably engaging at their inner ends, the horizontal legs of angles 57, 57 secured at their vertical legs to the inner sides of the side frame members 52, 52 and also forming retainers for the flights 21, 21 of the conveyor.

The hopper sections 54, 54 extend a substantial distance beyond the outer sides of the frame 14 and are shown as being supported at their outer ends on the frame structure 56 by means of inclined braces 58, 58 extending along the bottoms of said hopper sections and secured at their inner ends to said frame structure. The frame structure 56 is herein shown as being in the form of a yoke including a U-shaped rear end portion 59 extending beneath the conveyor frame 14 and beyond opposite sides thereof and upwardly along the side frame members 52, 52 and having frame members or arms 60, 60 extending forwardly therefrom along the side frame members 52, 52, to positions adjacent the forward end thereof, and connected together adjacent their forward ends by a tie bolt 61. A plate 62 is shown as extending along each side of the frame structure 56, and inwardly therefrom and forming a support for the brace 58 at its outer end and for each hopper section 54 at its inner end.

The frame 56 is supported on the frame members 52, 52 of the frame 14 on a plurality of rollers 65, 65 spaced longitudinally along each of said frame members and outwardly therefrom. The rollers 65, 65 are shown as having generally V-shaped engaging faces, having engagement with inwardly facing tracks 67, 67 secured to the frame structure 56 and extending therealong. The rollers 65, 65 are rotatably mounted in brackets 69, 69 secured to the outside of the frame members 52, 52, and herein shown as being U-shaped and having said rollers mounted therebetween on vertical pins 70, 70. The tracks 67, 67 may be welded to the inside of the frame 56 to form a slidable support for said frame and the inclined hopper sections 54, 54 on the forward end of the frame 14.

The means for reciprocably moving the frame 56, and hopper 53, along the side frame members 52, 52 of the frame 14 includes an eccentric 71 secured to each outer end of the transverse shaft 51 and rotatably driven thereby. The eccentric 71 is shown as being journaled in an eccentric strap 72. An annular retaining plate 73 is secured to the outer side of said eccentric strap as by machine screws 74, 74, to maintain said eccentric within said strap. The free end of each ececntric strap 72 extends between two spaced ears 75, 75 depending from the forward end of the arm 60, and is pivotally connected thereto, as by a pivot pin 76. Rotatable movement of the shaft 51 and eccentric 71 will thus reciprocably drive the frame structure 56 and hopper 53 along the receiving end of the conveyor section 14. It should here be noted that the stroke of movement of said hopper is rather short and that the frequency of reciprocation is relatively high, since the drive is directly from the shaft 51.

Each hopper plate or section 54 is shown as having an angularly disposed retaining wall 77 extending along its rear end and as having a plurality of parallel spaced angularly disposed baffles 79, 79 extending therealong from the outer to the inner ends thereof in the same general direction as the retaining wall 77. The baffles 79, 79 may be pressed in said plates from the underside thereof to form a single edge facing the discharge end of the machine, or may be separate strips secured thereto and extending therealong, and serve to progress the material that would otherwise not slide onto the conveyor 10, due to the flat angle of said hopper section, toward and onto said conveyor, upon reciprocable movement of the hopper 53. The forward under portion of the hopper 53 is shown as being abutted by a guard plate 81 extending downwardly from beneath the bottom of the plate 55 and free from said plate. The plate 81 is shown being secured at its lower end to a guard plate 83 spaced from the sprocket 50 and eccentric straps 72, 72 and extending partially therearound and forming a guard therefor. The guard plate 83 then extends upwardly along the bottoms of the side frame members 52, 52. Slots 84, 84 are provided in the side frame members 52, 52, to acommodate the tie rod 61 and permit reciprocable movement thereof with the frame structure 56.

In operation of the device, when following the discharge end of the tail conveyor of a continuous cutting and loading machine (not shown), the transfer conveyor 10 may be moved to follow the machine by the continuous tread devices 13, 13, and the front conveyor section 14 may be laterally moved to bring the hopper 53 beneath the discharge end of the cutting and loading machine tail conveyor. During the loading operation, the continuous tread devices 13, 13 are used principally to advance and retract the entire transfer conveyor, while the receiving end portion 14 of the conveyor is laterally swung from side to side and moved vertically to follow the tail conveyor of the cutting and loading machine.

As soon as the conveyor 10 starts in operation, the hopper 53 will reciprocate with a back and forth conveying motion, with a relatively short stroke and high frequency, to advance the coal discharged thereon along the baffles 79, 79 onto the conveyor 10 and provide a self-cleaning hopper loading all of the coal discharged thereon with little or no spillage. During loading of the hopper 53 and conveyor 10, the tail section 19 of said conveyor may be positioned to load one shuttle car, at the rear of the machine, and then may be swung to one side, or the other, to load a next adjacent shuttle car with no delay or spillage, as the one shuttle car is pulled away. A third shuttle car may then come into the position occupied by the first car and be loaded after the second shuttle car has been completely loaded, so as to assure a continuous flow of coal from the continuous cutting and loading machine to the material transporting means, as long as a supply of cars is maintained, and thus greatly increase the efficiency of the continuous cutting and loading machine and reduce the operating cost thereof.

It may be seen from the foregoing that continuous operation of the cutting and loading machine is attained by the provision of a mobile conveyor with laterally swinging and vertically adjustable forward and rear end portions for receiving the coal discharged thereon with a minimum amount of movement of the conveyor along the ground, and by providing the receiving end of the conveyor with a self-cleaning reciprocating hopper the sides of which are of a low angle so as to allow a discharge conveyor to pass thereover and take up as little head room as possible during loading, and having cooperating baffles directing the material discharged thereon, rearwardly and downwardly onto the receiving end of the conveyor upon reciprocable movement of the hopper.

It will be understood that modifications and variations may be effected without departing from the spirit and scope of the novel concepts of the present invention.

I claim as my invention:

1. A reciprocating material collecting and transferring hopper comprising a yoke including a generally U-shaped frame having parallel spaced arms extending forwardly from opposite sides thereof, means mounting said yoke for reciprocable movement and means for reciprocably driving said yoke, a hopper section extending along each of said arms, a hopper plate connecting the forward ends of said hopper sections together and forming a continuous hopper open at its rear end, said hopper sections being inclined downwardly from the outer to the inner ends thereof at relatively flat angles and having a plurality of rearwardly facing baffles thereon extending from the outer to the inner ends thereof in a rearwardly inclined direction.

2. A reciprocating material collecting and transferring hopper adapted to collect and transfer material onto a conveyor, comprising a reciprocably driven yoke including a generally U-shaped frame having parallel spaced arms extending forwardly from opposite sides thereof, longitudinally spaced cooperating rectilinear guide tracks and rollers mounting said yoke for reciprocable movement, a reciprocably driven link connected with at least one of said arms, for reciprocably driving the same, a hopper section extending along each of said arms, a hopper plate connecting the forward ends of said hopper sections together, said hopper sections being inclined downwardly from the oûter to the inner ends thereof at relatively flat angles and having a plurality of baffles thereon, extending from the outer to the inner ends thereof in a rearwardly inclined direction.

3. An articulated transfer conveyor comprising a mobile main frame, a conveyor frame extending along said main frame and beyond the forward and rear ends thereof and having a forward receiving end portion laterally movable with respect to said main frame and a discharge end portion laterally movable with respect to said main frame, a laterally flexible endless chain and flights movable along said conveyor frame, for progressing loose material therealong, a motor, and means driven by said motor for driving said chain and flights, a material-receiving hopper at the forward end of said main frame, means supporting said hopper for reciprocable movement along said main frame, and means reciprocably driving said hopper, said hopper having inclined hopper sections extending along each side of said conveyor having inclined baffles extending therealong from the outer side thereof toward the conveyor, and inclined in the direction of travel of said conveyor, for progressing loose material rearwardly along said hopper sections onto said conveyor, upon reciprocating movement of said hopper.

4. A mobile transfer conveyor comprising a main frame, a conveyor frame extending along said main frame and beyond the forward end thereof and mounted for lateral movement with respect thereto, an endless chain and flights movable along said conveyor frame for progressing loose material therealong, a motor on said main frame, a drive connection from said motor to said chain and flights, a material transferring hopper extending along the forward end of said conveyor frame and including an inclined hopper section extending along each side of said conveyor frame, slidable support and guide means for said hopper sections on said conveyor frame, supporting said hopper sections for reciprocable movement along said conveyor, means reciprocably moving said hopper sections along said conveyor frame, and said hopper sections being inclined downwardly toward said conveyor at relatively flat angles and having rearwardly facing baffles extending inwardly from the outer ends thereof and inclined rearwardly with respect to said conveyor.

5. In a mobile transfer conveyor, a main frame, a conveyor frame extending along said main frame and beyond the forward end thereof and mounted for lateral movement with respect thereto, an endless chain and flights movable along said conveyor frame, a motor on said main frame, means driven by said motor for driving said chain and flights along said conveyor frame, a material transferring hopper extending along opposite sides of said conveyor frame and across the forward end thereof and including two inclined hopper sections, one of which extends along each side of said conveyor frame, support and guide means supporting said hopper sections for reciprocable movement along said conveyor frame, a third hopper section extending across the forward end of said conveyor frame and connecting said two hopper sections together, said hopper sections being inclined at relatively flat angles with respect to said conveyor frame and having baffles thereon facing the rear of said hopper sections and inclined from the outer side thereof toward said conveyor in a rearwardly inclined direction.

6. In a mobile transfer conveyor, a main frame, a conveyor frame extending along said main frame and beyond the forward end thereof, an endless chain and flights movable along said conveyor frame, a motor on said main frame, a drive sprocket meshing with said conveyor chain and driven by said motor, for driving said chain and flights, a shaft having a sprocket thereon, at the forward end of said conveyor frame and forming a direction changing device for said conveyor chain and a drive means for said shaft, a material transferring hopper extending along opposite sides of said conveyor frame and comprising two hopper sections and a frame connecting said hopper sections together and mounting said hopper sections for reciprocable movement along said conveyor frame, said hopper sections being inclined downwardly toward said conveyor frame and being connected together adjacent their forward ends and having baffles extending therealong and inclined from the outer ends thereof rearwardly toward said conveyor, and reciprocating drive mechanism driven from said shaft and operatively connected with said frame, for reciprocably driving the said hopper sections.

7. In a mobile transfer conveyor, a main frame, a conveyor frame extending along said main frame and beyond the forward end thereof, an endless chain and flights movable along said conveyor frame, a motor on said main frame, a sprocket driven from said motor for driving said chain and flights along said conveyor frame, a material transferring hopper at the forward end of said main frame for transferring loose material onto said conveyor, said hopper including two inclined hopper sections extending along opposite sides of said conveyor frame, a third hopper section extending across the front of said conveyor frame and overlapping said conveyor and connecting said hopper sections together, support and guide means supporting said hopper sections for reciprocable movement along said forward portion of said conveyor frame, a shaft at the forward end of said conveyor frame, a sprocket on said shaft meshing with said chain and forming a direction changing device therefor and a drive member for said shaft, an eccentric on an end of said shaft, a strap connecting said eccentric to said hopper sections for reciprocably moving said hopper sections along said conveyor frame, and said hopper sections having upwardly projecting inclined baffles facing to the rear of said hopper sections and extending therealong and inclined from the outer side thereof rearwardly toward said conveyor frame, whereby material on said hopper sections is progressed onto said conveyor upon reciprocable movement of said hopper sections.

8. In a transfer conveyor, a frame having a conveyor supported for movement therealong, material collecting and transfer means mounted on said frame and extending along opposite sides thereof including a yoke extending along each side of said frame and therebeneath, means supporting said yoke on said frame for rectilinear movement therealong including cooperating roller and track means on said frame and yoke, hopper sections mounted on said yoke and extending along each side of said conveyor frame, and inclined downwardly toward said frame and having baffle means thereon directed toward said conveyor for advancing loose material onto said conveyor, and means reciprocably driving said yoke and hopper sections, to advance material deposited thereon onto said conveyor.

9. In a mobile transfer conveyor, a laterally movable frame having a conveyor supported for movement therealong, material collecting and transfer means on said frame, said material collecting and transfer means including a yoke extending beneath said conveyor and upwardly along opposite sides thereof, cooperating roller and track means on said frame and yoke, supporting said yoke for reciprocable movement along said frame, means reciprocably driving said yoke, inclined hopper sections mounted on said yoke and extending along each side of said frame, an inclined plate at the forward end of said frame connecting said hopper sections together, said hopper sections each having baffles thereon projecting upwardly from the surface thereof and facing the rear of said conveyor and inclined from the outer edges of said hopper sections toward the rear of said conveyor, for advancing loose material onto said conveyor, upon reciprocating motion of said hopper sections.

10. An articulated transfer conveyor comprising a mobile main frame, a conveyor frame extending along said main frame and beyond the forward and rear ends thereof and having a forward receiving end portion laterally movable with respect to said main frame and a discharge end portion laterally movable with respect to said main frame, a laterally flexible endless chain having spaced flights projecting therefrom movable along said conveyor frame, for progressing loose material therealong, a motor, means driven by said motor for driving said chain and flights, a material-receiving hopper at the forward end of said main frame, means supporting said hopper for reciprocable movement along said main frame, reciprocating drive mechanism driven from said conveyor and operatively connected with said hopper for reciprocably driving the same to progress loose material onto said conveyor, said hopper having inclined hopper sections extending along each side of said conveyor and overlapping the edges thereof, and an inclined hopper plate connecting the forward ends of said hopper sections together.

11. In a transfer conveyor, a frame having a conveyor supported for movement therealong, a shaft at the forward end of said frame driven by said conveyor and forming a direction-changing member therefor, material collecting and transfer means mounted on said frame and extending along opposite sides thereof, including a yoke extending along each side of said frame and therebeneath, roller means supporting said yoke on said frame for rectilinear movement therealong, reciprocating drive mechanism driven from said shaft and operatively connected with said yoke for reciprocably driving said yoke, and hopper sections mounted on said yoke and extending along each side of said conveyor frame and inclined downwardly toward said frame to advance material deposited thereon onto said conveyor upon reciprocable movement thereof.

References Cited in the file of this patent

UNITED STATES PATENTS

| Number | Name | Date |
|---|---|---|
| 343,755 | Buel | June 15, 1886 |
| 1,843,042 | Nyborg | Jan. 26, 1932 |
| 2,543,519 | Baechli | Feb. 27, 1951 |
| 2,557,623 | Wenner | June 19, 1951 |
| 2,599,659 | Phillips | June 10, 1952 |

FOREIGN PATENTS

| Number | Country | Date |
|---|---|---|
| 598,238 | Germany | June 7, 1934 |